United States Patent [19]
Flaherty et al.

[11] Patent Number: 5,243,637
[45] Date of Patent: Sep. 7, 1993

[54] APPARATUS AND METHOD FOR ASSURING STABLE CLOCK GENERATOR DURING OSCILLATOR START-UP

[75] Inventors: Edward H. Flaherty; David A. Van Lehn, both of Houston, Tex.

[73] Assignee: Texas Instruments Incorporated, Dallas, Tex.

[21] Appl. No.: 893,291

[22] Filed: Jun. 4, 1992

Related U.S. Application Data

[60] Division of Ser. No. 664,901, Mar. 5, 1991, which is a continuation of Ser. No. 359,185, May 31, 1989, Pat. No. 5,034,624.

[51] Int. Cl.$^5$ .............................................. H03K 21/00
[52] U.S. Cl. ........................................ 377/95; 377/94; 377/96; 307/227
[58] Field of Search ............................ 377/94, 95, 96; 307/227

[56] References Cited

U.S. PATENT DOCUMENTS

| | | | |
|---|---|---|---|
| 3,474,235 | 10/1969 | Singer | 377/95 |
| 3,714,587 | 1/1973 | Lindsey et al. | 377/95 |
| 4,200,812 | 4/1980 | Fichter | 377/95 |
| 5,034,624 | 7/1991 | Flaherty et al. | 307/269 |

Primary Examiner—William L. Sikes
Assistant Examiner—Scott A. Ouellette
Attorney, Agent, or Firm—Mark A. Valetti; B. Peter Barndt; Richard L. Donaldson

[57] ABSTRACT

A clock stability circuit (10, 20, 30, 40) assures stable clock generator operation after oscillator start-up, such as during re-entry after a low-power Halt mode in a microprocessor or microcomputer. The clock stability circuit detects stable clock cycles that transition between a selected high amplitude threshold (near VDD) and a selected low amplitude threshold (near VSS), and provides a clock stable signal after a selected number of stable clock cycles, indicating that the oscillator has stabilized. The clock stability circuit includes four modules: input sampler (10), pulse generator (20), pulse counter (30) and control logic (40). The input sampler module includes CMOS NAND gates (11, 14) respectively fabricated with p/n-channel ratios to provide a CLOCK A signal that transitions at the selected high amplitude threshold of an oscillator cycle, and a CLOCK B signal that transitions at the selected low amplitude threshold. The pulse generator module (20) functions as a modified edge-triggered D flip-flop (21, 23) that triggers in response to paired transitions of CLOCK A and CLOCK B (indicating that the oscillator clock has cycled through both the high and low amplitude thresholds), generating a transition pulse. The pulse counter module (30) includes a pulse counter capacitor (Cl) and a pulse detection transistor (31) that is turned on during each transition pulse to provide a charging path for the pulse counter capacitor, thereby incrementally charging the pulse counter capacitor in response to transition pulses. When the pulse counter capacitor (Cl) is charged to a level corresponding to the receipt of a selected number of transition pulses, a Schmitt trigger circuit (34) is activated to provide a CLOCK STABLE signal, indicating that the oscillator clock has provided a selected number of stable clock cycles. The control logic module (40) provides ENABLE, /CHARGE and DISCHARGE signals that control operation of the clock stability circuit in a microcomputer during Halt, Start and Run modes.

1 Claim, 2 Drawing Sheets

APPARATUS AND METHOD FOR ASSURING STABLE CLOCK GENERATOR DURING OSCILLATOR START-UP

This is a divisional of application Ser. No. 07/664,901 filed Mar. 5, 1991 which is a continuation of application Ser. No. 07/359,185 filed May 31, 1989 now U.S. Pat. No. 5,034,624.

TECHNICAL FIELD OF THE INVENTION

This invention relates to clock-driven digital devices, such as microcomputers and microprocessors, and more particularly relates to a circuit and method for determining stable clock generator operation after oscillator start-up, such as during re-entry after a low-power halt condition.

BACKGROUND OF THE INVENTION

It is often desirable for microprocessors and microcomputers (i.e., microprocessors with on-board memory and peripherals) to enter a low-power or Halt mode of operation when not executing instructions.

A Halt mode is entered by placing the device in a "frozen" state in which the crystal oscillator and all clocks are shut down, such that no logic switching occurs. Typically, a microprocessor or microcomputer will have different levels of clocking, with a clock generator creating a master system clock. To enter a Halt mode, the clock generator responds to a HALT command by turning off the system clock that drives the various logic clocks throughout the microcomputer, and then using an internal clock, shuts down the crystal oscillator. At that point, the device is in the Halt mode (frozen) with all logic operations terminated.

After being placed in a Halt mode, the device must transition rapidly to the normal Run operational mode upon the receipt of an interrupt or similar signal from the user or some external circuit. A re-entry or Start transition period is required to re-start the crystal oscillator and recover a stable system clock from the clock generator. That is, tefore any internal processing logic is enabled, the device must complete a Start operation, during which the crystal oscillator is turned on and fed to the clock generator to generate the system clock. This Start mode must last long enough for the oscillator, and therefore the system clock, to stabilize and provide an accurate system clock.

The problem of assuring a stable clock generator output during the Start transition from Halt to the Run operational mode is not the same as the problem of assuring stable clock generator output during power-up. For power-up, a reset pulse initiates a reset sequence and assures stable clock generator output merely by the passage of time. However, for a Halt-to-Run transition, a reset sequence is not required, but rather, it is only necessary to recover the system clock to enable the microcomputer to begin executing instructions as rapidly as possible. The limiting factor in re-entering the Run mode of operation is the recovery of a stable system clock from the clock generator.

Determining when a stable system clock is available from the clock generator during the Start mode depends upon detecting when the re-started crystal oscillator stabilizes and starts beating with the correct frequency and amplitude. Crystal oscillators generally start up with a fairly stable frequency, but with significant amplitude variations. Typically, after a few unsynchronized high-amplitude pulses, the oscillator begins beating at the proper frequency but with a very small amplitude that gradually increases until the oscillator is outputting clock cycles of substantially uniform amplitude (typically approximately between VDD and VSS) at a predetermined frequency.

Heretofore, microcomputers and microprocessors that offer a low-power Halt mode of operation have determined oscillator/clock generator stability, i.e., the duration of the Start mode, by using a large digital counter circuit to count a large number of oscillator clock cycles, after which it is assumed that the oscillator has stabilized and a stable system clock output from the clock generator is available for re-entry into the Run mode. Typically, these devices use a large (more than 10-bit) digital counter capable of counting thousands of clock cycles. Since each bit of the digital counter is normally implemented as a D flip-flop, a digital counter includes multiple D flip-flop circuits, together with associated counter logic.

The digital counter approach to assuring a stable clock generator output after oscillator start-up is disadvantageous for several reasons. The digital counter technique is not entirely reliable because it does not detect oscillator stability, but rather assumes stable operation after a given, albeit large, number of oscillator cycles. As a practical matter, this disadvantage is not too significant because the digital counters are made large enough that stable clock generator operation is achieved during most Start transitions. Nevertheless, the digital counter technique does impact reliability, and in any event, leads to more significant disadvantages. Specifically, in order to have some assurance that stable clock generator operation will be achieved during the Start transition mode, the digital counters count thousands of clock cycles to account for worst case instances of oscillator instability, even though oscillators often stabilize more rapidly than that. Thus, these counters are disadvantageous in terms of delaying unnecessarily (in most cases) the transition to the Run mode. Moreover, a counter of that size is disadvantageous in terms of the amount of logic necessary to implement it.

Accordingly, a need exists for a clock stability circuit for clock-driven digital devices, such as microcomputers and microprocessors, that determines when the device's clock generator is outputting a stable system clock after oscillator start-up, such as during a Start transition from a low-power Halt mode to the normal Run mode of operation. In general, a satisfactory clock stability circuit would actually detect stable oscillator clock operation, thereby assuring a stable clock generator output, and would be implemented with a significantly fewer number of logic elements than required by current digital counter techniques to conserve power and silicon surface area.

SUMMARY OF THE INVENTION

The present invention assures stable clock generator operation after oscillator start-up (such as during a re-entry Start transition from low power Halt to Run operational modes), by providing a clock stability circuit that detects oscillator clock stability by monitoring oscillator clock cycles to determine when the oscillator is cycling between selected high and low amplitude thresholds to provide a selected degree of noise margin on both the high and low ends.

In one aspect of the clock stability circuit of this invention, the circuit detects stable oscillator clock cycles that cycle through selected high and low threshold levels, and provides a clock stable signal after a selected number of such stable oscillator cycles. The clock stability circuit may comprise: (a) high/low transition logic that generates a high/low transition signal each time the oscillator cycles through the selected high and low threshold levels; and (b) stability detection logic that receives the transition signals, and provides a clock stable signal after a selected number of these signals (i.e., a selected number of clean high/low transitions of the oscillator clock), which indicates that the oscillator has provided a selected number of stable clock cycles with a selected amount of noise margin at the high and low ends, and therefore, has achieved stability.

The high/low transition logic may comprise: (a) clock A logic for providing a high-threshold signal when the oscillator cycles through a selected high threshold level; (b) clock B logic for providing a low-threshold signal when the oscillator cycles through a selected low threshold level; and (c) transition signal generator logic that receives the high-and low-threshold signals, and generates a high/low transition signal for each high/low-threshold signal pair representing a stable clock cycle in which the oscillator cycled through both high- and low-threshold levels. The stability detection logic may comprise: (a) transition signal counter logic that counts the transition signals from the high/low transition logic; and (b) clock stable detection logic that detects when the transition signal counter logic has received a selected number of transition signals, and then provides the clock stable signal.

Thus, the clock stability method of the present invention involves: (a) generating a high-threshold signal when the oscillator cycles through a selected high threshold level; (b) generating a low-threshold signal when the oscillator cycles through a selected low threshold level; and (c) generating a clock stable signal after a selected number of high/low threshold signals, thereby indicating that the oscillator has provided a selected number of stable clock cycles that cycle through selected high and low threshold levels, and therefore has achieved stability.

In its more specific aspects, the clock stability circuit is included in a microcomputer that has three modes of operation—Run, Halt and Start—where the Halt mode is a low-power condition in which all logic clocks, including the system clock from the clock generator, are turned off, as is the oscillator.

The clock stability circuit includes the following modules: input sampler, pulse generator, pulse counter and control logic. These modules require significantly fewer logic elements than a 4-bit digital counter, which is significantly less logic than required by the digital counter approach to assuring stable clock generator operation.

The input sampler module includes three parallel NAND gates that each receives the oscillator clock signal and provides respective outputs CLOCK A (high threshold), CLOCK B (low threshold) and SYSCLOCK (system clock). These gates are built in CMOS using both P-channel and N-channel transistors. These gates are configured with respective P/N-channel size ratios such that the CLOCK A output from the Clock A NAND gate transitions at a selected high-threshold level (near VDD) of the input oscillator signal, while the CLOCK B output from the Clock B NAND gate transitions at a selected low threshold-level (near VSS). The Sysclock NAND gate transitions at approximately halfway between VDD and VSS (the high/low transition point of the input oscillator clock cycle), outputting a SYSCLOCK system clock that is provided to the microcomputer's clock generator.

The pulse generator module receives CLOCK A (high-threshold) and CLOCK B (low-threshold). It includes triggered pulse logic, and delay line logic. The triggered pulse logic functions as a modified edge-triggered D flip-flop, with the clock input to the flip-flop being derived from the high/low-threshold signals CLOCK A and CLOCK B. The triggered pulse logic generates a transition /PULSE (i.e., the flip-flop is triggered) when the input clock signals CLOCK A and CLOCK B both make a transition indicating that the oscillator has cycled from a high threshold to a low threshold. This transition /PULSE is fed through the delay line back to the input of the triggered pulse logic, clearing the flip-flop and terminating the transition /PULSE. That is, the triggered pulse logic generates a transition /PULSE only when both CLOCK A and CLOCK B together indicate a transition of the oscillator clock from a selected high to a selected low amplitude threshold.

The pulse counter module receives the transition PULSE. It includes a transition pulse detection transistor, a transition pulse counter capacitor and a Schmitt trigger circuit. Each transition /PULSE from the pulse generator module turns on the pulse detection transistor for the duration of the /PULSE, allowing a charging current to flow to the PULSE counter capacitor. Thus, with each transition /PULSE, the pulse counter capacitor incrementally charges to a selected clock stable (Vih) threshold of the Schmitt trigger, at which time the Schmitt trigger turns on (active) to provide a CLOCK STABLE signal. The CLOCK STABLE signal notifies the microcomputer that the oscillator, and therefore the SYSCLOCK system clock output from the input sampler module, have achieved stability.

The control logic module controls the operation of the clock stability circuit, initiating a Halt mode in response to a HALT command and initiating a Start transition mode in response to a RUN command (the Run mode being initiated by the CLOCK STABLE signal generated by the clock stability circuit during the Start mode). In response to a HALT command, the control logic provides a DISCHARGE signal to the pulse counter module that causes the pulse counter capacitor to discharge, switching the CLOCK STABLE output from the Schmitt trigger inactive. When the control logic module receives a RUN command it initiates a Start mode transition by switching the DISCHARGE signal inactive, thereby enabling the pulse counter capacitor to charge in response to transition PULSEs from the pulse generator module.

The technical advantages of the clock stability circuit of this invention include the following. The circuit detects stable oscillator clock cycles that make a clean high/low transition between selected high/low threshold levels (approximately VDD and VSS), allowing an accurate and reliable determination of oscillator stability. Moreover, as a result of detecting clock cycles that meet selected stability criteria, the Run mode can be re-entered rapidly after oscillator stability is achieved, allowing an efficient, accurate and reliable Start mode transition from Halt to the Run operational mode. The circuit is implemented with four logic modules, which together incorporate significantly fewer logic elements than a 4-bit digital counter, allowing the circuit to be fabricated with fewer logic elements, taking up less silicon area, than digital counters. The circuit controls the duration of the Start mode transition based on any of four circuit parameters—the number of inverters included in the delay line logic, the resistance on the charging path for the pulse counter capacitor, the capacitance of the pulse counter capacitor, and the voltage threshold of the Schmitt trigger circuit—allowing considerable design flexibility.

BRIEF DESCRIPTION OF THE DRAWINGS

For a more complete understanding of the present invention and for further features and advantages, reference is now made to the following Detailed Description, taken in conjunction with the accompanying Drawings, in which.

DETAILED DESCRIPTION OF THE INVENTION

The preferred embodiment of the clock stability circuit of this invention has been implemented in a microcomputer (or microcontroller) available from Texas Instruments Inc., the assignee of this invention, Model No. 370CXXX, which has three operational modes: Run, Halt and Start. The clock stability circuit is readily adaptable to any clock-driven digital device (whether or not it offers a low-power operational mode), and in particular, to any microcomputer or microprocessor implementing a low-power Halt mode of operation.

Figure 1:
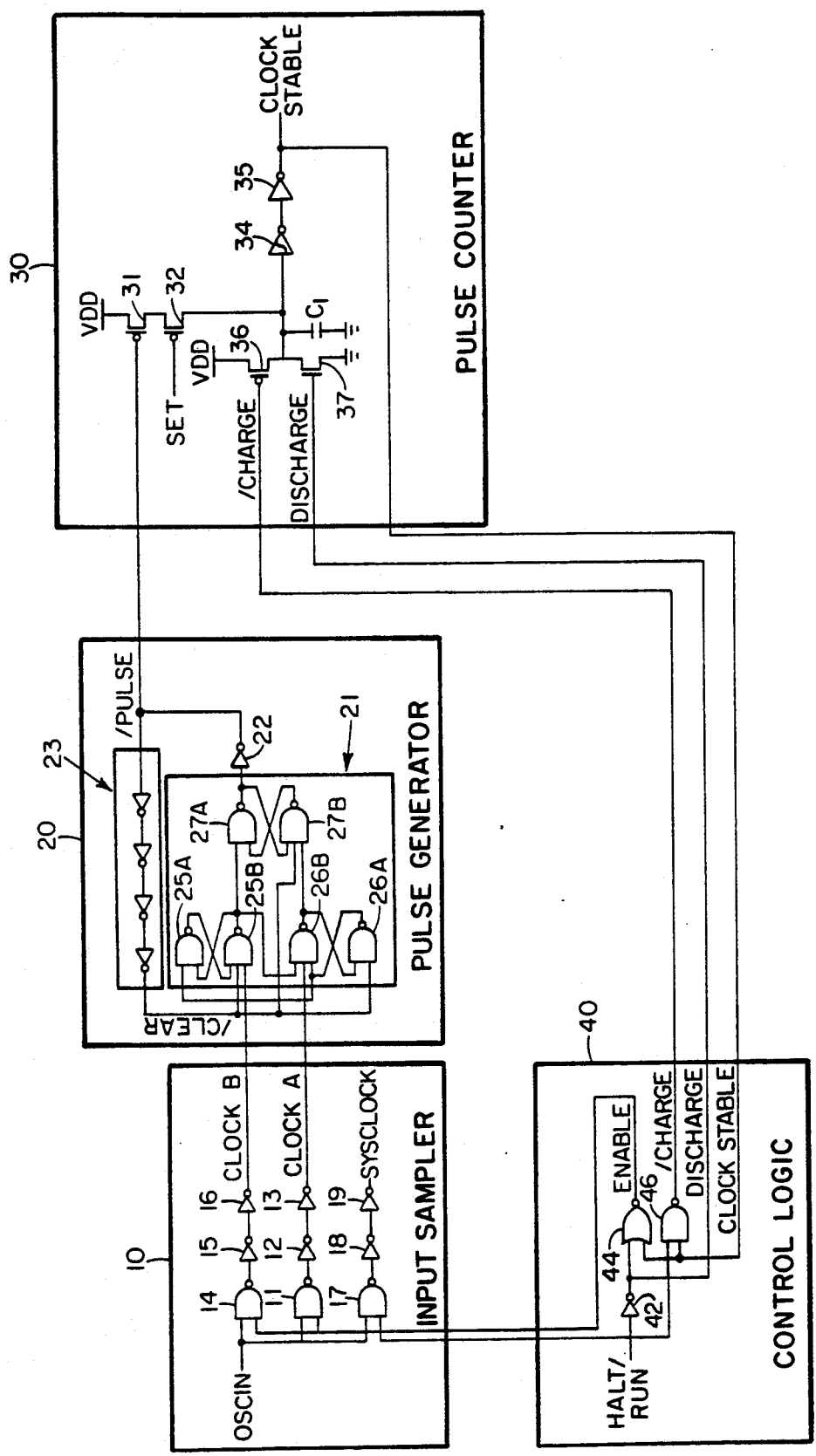
FIG. 1 shows the clock stability circuit, including its four logic modules—input sampler, pulse generator, pulse counter and control logic.

The Detailed Description of the preferred embodiment is organized as follows:

1. General
2. Input Sampler Module
3. Pulse Generator Module
4. Pulse Counter Module
5. Control Logic
6. Conclusion 1. General. As shown in FIG. 1, the clock stability circuit includes four separate logic modules: Input Sampler 10, Pulse Generator 20, Pulse Counter 30 and Control Logic 40.

The input sampler module 10 receives an oscillator clock input OSCIN from a crystal oscillator (not shown)—the oscillator clock OSCIN is assumed to oscillate (when stable) between approximately the VDD and VSS levels for the microcomputer (nominally +5 and 0 volts) In response to OSCIN, the input sampler module generates CLOCK A and CLOCK B, which respectively represent transitions of OSCIN through high and low amplitude threshold (near VDD and VSS), as well as the microcomputer system clock SYSCLOCK, which is a digitized representation of the oscillator clock OSCIN.

CLOCK A and CLOCK B are input to pulse generator module 20 which generates a transition /PULSE each time OSCIN makes a transition between the high/low amplitude thresholds, as represented by CLOCK A and CLOCK B, indicating stable clock cycles The transition /PULSEs are detected by pulse counter module 30 which, after counting a selected number of these /PULSEs (such as 30), provides a CLOCK STABLE signal indicating to the microcomputer that the oscillator clock OSCIN has stabilized and a stable system clock SYSCLOCK is available from input sampler module 10.

Thus, the input sampler module in effect filters low amplitude cycles of the oscillator clock OSCIN, while the pulse counter module in effect filters extraneous high amplitude but nevertheless unstable oscillator clock cycles (such as occur immediately after oscillator start-up).

Control logic module 40 receives HALT/RUN commands that initiate a Halt mode or a Start mode transition to a Run mode. In response to a HALT command, the control logic module turns off the system clock SYSCLOCK, and generates a DISCHARGE signal that makes the CLOCK STABLE output from the pulse counter module inactive (i.e., the microcomputer is in a Halt condition with the oscillator OSCIN and the system clock SYSCLOCK turned off).

When the microcomputer receives an interrupt or other external command requiring a rapid transition to the Run mode, it provides a RUN command to the control logic module. The control logic module generates an ENABLE signal that turns on the input sampler module (which outputs the digitized system clock SYSCLOCK and the high/low threshold signals CLOCK A and CLOCK B), and switches the DISCHARGE signal inactive (which enables the pulse counter module to count the high/low transition PULSEs from the pulse generator module).

The control logic module detects the CLOCK STABLE signal going active (after the selected number of transition /PULSEs, and switches the ENABLE signal inactive to turn off CLOCK A and CLOCK B without affecting SYSCLOCK, and generates a /CHARGE signal that maintains the CLOCK STABLE signal active throughout the Run mode (i.e., until the next Halt condition, when a HALT command causes the control logic module to switch /CHARGE inactive and DISCHARGE active, making CLOCK STABLE inactive).

2. Input Sampler Module. As shown in FIG. 1, input sampler module 10 includes three NAND gates 11, 14 and 17, each of which receives as one input the oscillator clock OSCIN from the oscillator (not shown). NAND gate 11 and an inverter pair 12/13 are used to generate a high-threshold CLOCK A, while NAND gate 14 and an inverter pair 15/16 generate a low-threshold CLOCK B. NAND gate 17 and an inverter pair 18/19 generate the system clock SYSCLOCK.

In addition to generating clock signals, the NAND gates and their corresponding inverter pairs amplify the input OSCIN oscillator clock. Sysclock NAND gate 17 and its inverter pair 18/19 generate an amplified, cleanly digitized system clock SYSCLOCK that is provided to the clock generator circuitry of the microcomputer. This clock generator circuitry is not shown, and need not be described, being conventional in design.

NAND gates 11, 14 and 17 are fabricated in CMOS, using both P-channel and N-channel transistor elements. The sizes of the N-channel elements versus the sizes of the P-channel elements can be considered as a ratio. By selecting this ratio, the switching point (transfer characteristic) of the gate can be specified.

Clock A NAND gate 11 is fabricated with an N/P-channel ratio that causes its switching point to be near VDD, defining a high amplitude threshold for OSCIN. CLOCK B NAND gate 14 is fabricated with an N/P-channel ratio that causes its switching point to be near VSS, defining a low amplitude threshold for OSCIN. Sysclock NAND gate 17 is fabricated with an N/P-channel ratio that causes its switching point to be approximately centered between VDD and VSS, defining the high/low transition point for SYSCLOCK. Thus, high-threshold CLOCK A transitions when the oscillator clock OSCIN cycles through a high level (near VDD on either a rising or falling edge of OSCIN). Conversely, low-threshold CLOCK B transitions when OSCIN cycles through a low level (near VSS on either a rising or falling edge of OSCIN).

Figure 3:
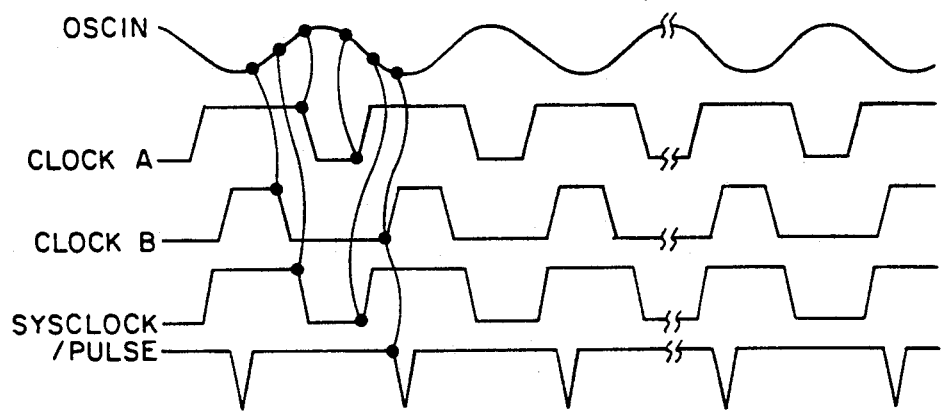
FIG. 3 shows the timing relationship of various signals during the Start transition mode—OSCIN, CLOCK A, CLOCK B, SYSCLOCK and /PULSE.

The timing relationship between the input oscillator clock OSCIN and the CLOCK A, CLOCK B and SYSCLOCK signals once the oscillator has stabilized is shown by the respective waveforms in FIG. 3. In stable operation, the oscillator cycles between approximately the VDD and VSS voltages. The clocks CLOCK A, CLOCK B and SYSCLOCK generated by input sampler module 10 are inverted from the input oscillator clock OSCIN. Considering a low-to-low cycle of OSCIN (i.e., a rising edge to falling edge), as the amplitude of OSCIN rises from a low amplitude (VSS) Clock B NAND gate transitions low at the selected low amplitude threshold (near VSS as determined by its N/P-channel ratio), and Clock A NAND gate 11 transitions low at the high amplitude threshold (near VDD as determined by its N/P-channel ratio), while Sysclock NAND gate 17 transitions low between these two CLOCK B/CLOCK A low/high-threshold transitions. After the amplitude of OSCIN peaks (VDD), on the falling edge of OSCIN, CLOCK A transitions high when OSCIN cycles through the selected high threshold, and CLOCK B transitions high when OSCIN cycles through the selected low threshold, while SYSCLOCK transitions high as OSCIN cycles from the high threshold to the low threshold, defining a high/low transition.

Thus, input sampler module 10 acts as a filter to reject input OSCIN oscillator clock cycles that do not attain either the selected high amplitude threshold (high-threshold CLOCK A) or the selected low amplitude threshold (low-threshold CLOCK B). That is, if both CLOCK A and CLOCK B are transitioning, then the input oscillator clock OSCIN is cycling between the selected high and low amplitude thresholds. In that case, it can be assumed that the system clock SYSCLOCK is a cleanly digitized representation of the input OSCIN oscillator clock, since the Sysclock NAND gate 17 switching point (approximately centered between VDD and VSS) is being crossed with the selected amount of noise margin on both the high and low ends.

Clock A NAND gate 11 and Clock B NAND gate 14 are controlled by an ENABLE input from control logic module 40. When the ENABLE input is active, during a Start mode transition from Halt to Run, Clock A NAND 11 and Clock B NAND gate 14 are enabled for output in accordance with the input OSCIN and their respective high/low-threshold transition points. Sysclock NAND gate is controlled by a HALT/RUN input from the control logic module (i.e., the HALT/RUN command from the microcomputer). When the microcomputer generates a HALT command, Sysclock NAND gate 17 is disabled, and its output system clock SYSCLOCK turned off, thereby conserving power during the Halt mode. When the microcomputer provides a RUN command to initiate a Start transition to a Run mode, Sysclock NAND gate 17 is enabled to output the system clock SYSCLOCK in accordance with the input oscillator clock OSCIN.

The detailed specification for fabricating the logic elements in input sampler module 10, and in particular the NAND gates 11, 14 and 17, is a matter of routine design choice, subject to implementing the selected high/low-threshold transition points for Clock A NAND gate 11 and Clock B NAND gate 14. Clock A NAND gate 11 is fabricated from P-channel elements with wider channel widths than the N-channel elements. Clock B NAND gate 14 is fabricated from P-channel elements with narrower channel widths than the N-channel elements. Sysclock NAND gate 17 is fabricated with P-channel elements and N-channel elements of approximately the same channel widths, taking into account any differences in strengths between P- and N-channel transitors. The P- and N-channel devices that make up Sysclock NAND gate 17 are preferably fabricated with channel widths larger than those for the Clock A/Clock B NAND gates to provide a squarer, more clearly digitized system clock output.

3. Pulse Generator Module. The high/low threshold signals CLOCK A and CLOCK B generated by input sampler module 10 during Start mode operation are input to pulse generator module 20.

As shown in FIG. 1, pulse generator module 20 includes a triggered pulse logic circuit 21 and a series-inverter delay line 23. Triggered pulse logic 21 provides a transition /PULSE output through an inverter 22 that provides the output of the pulse generator module, and is fed back through the series-inverter delay line 23 to provide a /CLEAR input to the triggered pulse logic.

Triggered pulse logic 21 comprises three pairs of NAND gates interconnected to form a modified edge-triggered D flip-flop. NAND gate pair 25A and 25B are cross-coupled output-to-input, with NAND gate 25B also receiving the /CLEAR input and the high-threshold CLOCK A signal from input sampler module 10. NAND gates 26A and 26B are cross-coupled output-to-input, with NAND gate 26A also receiving the /CLEAR input, and with NAND gate 26B also receiving the low-threshold CLOCK B signal from input sampler module 10. In addition, one input to NAND gate 25A is tied to an input to NAND gate 26B, while the output of NAND gate 25B is coupled to an input to NAND gate 26B.

NAND gates 27A and 27B are cross-coupled output-to-input, with NAND gate 27A also receiving the output from NAND 25B, and NAND gate 27B also receiving both /CLEAR and the output from NAND gate 26B. NAND gate 27A provides the PULSE output of the triggered pulse logic 21 that is inverted by inverter 22 to provide the transition /PULSE output of pulse generator module 20.

The /PULSE output from triggered pulse logic 21 (through inverter 22) is fed back through the series-inverter delay line 23. Delay line 23 includes four inverters in series that delay the /PULSE output to provide the /CLEAR input to triggered pulse logic 21.

The operation of the triggered pulse logic 21 can be described using the terminology associated with edge-triggered D-type flip-flops. The PULSE output from NAND gate 27A corresponds to the Q output of the flip-flop. Fed through inverter 22 and the delay line inverters 23, it becomes the /CLEAR input to the flip-flop. The D input to the flip-flop can be considered to be tied to logic state 1. The clock input to the flip-flop is derived from two signals, the high/low threshold signals CLOCK A and CLOCK B (which are input to, respectively, NAND gates 25B and 26B).

When the clock inputs CLOCK A and CLOCK B both make a transition from a logical state 0 to a logical state 1, the flip-flop has received a rising clock edge which triggers the flip-flop. Since the D input is effectively logic state 1, the PULSE (Q) output is set to logic state 1 and /PULSE is driven to logic state 0, defining the leading edge of the (negative-going) high/low transition /PULSE output from the pulse generator module 20. As shown in FIG. 3, as oscillator clock OSCIN cycles on a falling edge through the selected high- and low-threshold levels, first CLOCK A and then CLOCK B transition from low to high, triggering a /PULSE transition from high to low (the leading edge of /PULSE). The /PULSE output from the triggered pulse logic 21 (through inverter 22) is fed back through delay line 23, causing the /CLEAR input to the triggered pulse logic to transition low, clearing the flip-flop. This /CLEAR transition, delayed by delay line 23, causes the /PULSE output from the triggered pulse logic to return to logic state 1 (the trailing edge of /PULSE).

Figure 2:
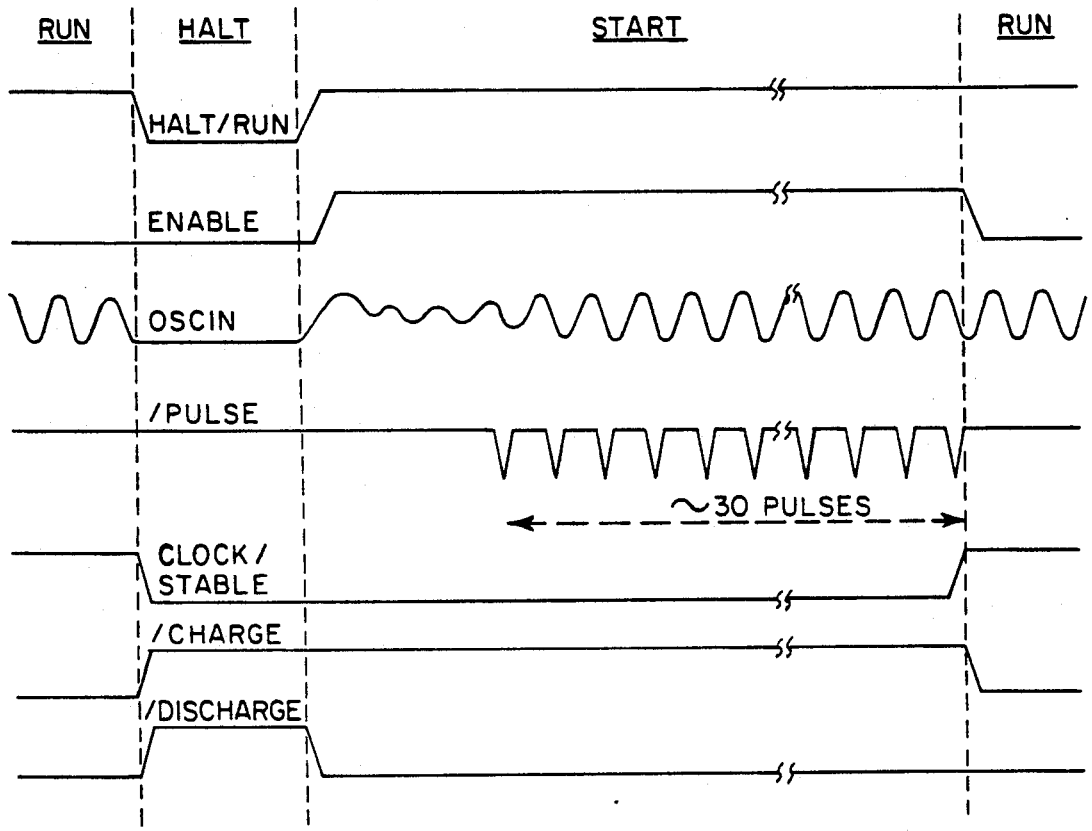
FIG. 2 diagrams the principal signals for the clock stability circuit through the various modes of operation—Halt, Start and Run.

Thus, for each high/low transition of OSCIN (represented by the low/high transitions of CLOCK A/-CLOCK B), a single negative-going high/low transition /PULSE is generated with its width being controlled by the amount of delay introduced by the delay line 23 (the depiction of these /PULSEs in FIGS. 2 and 3 as negative-going spikes is illustrative of their widths relative to the other clock signals). Only when both of the high/low threshold signals CLOCK A and CLOCK B (i.e., the clock inputs to the triggered pulse logic 21) return to logic state 0 (after a rising edge of the oscillator clock cycles through the low and high-level thresholds as shown in FIG. 3) is the triggered pulse logic 21 reset and able to generate another /PULSE output triggered by the next pair of low/high transitions of CLOCK A and CLOCK B. While the triggered pulse logic may initially be triggered by a CLOCK A transition during one OSCIN cycle and a CLOCK B transition during another OSCIN cycle, this unstable condition will typically last no more than a few cycles before CLOCK A and CLOCK B transitions occur in pairs during the same OSCIN cycle.

If the oscillator clock OSCIN does not have sufficient amplitude to transition through both the high and low thresholds established by input sampler module 10 (i.e., Clock A and Clock B NAND gates 11 and 14) thereby causing the high/low-threshold signals CLOCK A/-CLOCK B to transition both low and high, then the triggered switching logic 21 does not detect a triggering clock edge, and no transition /PULSE is generated. Thus, pulse generator module 20, in conjunction with input sampler module 10, rejects oscillator clock cycles that do not meet the selected amplitude criteria for stable oscillator operation.

In summary, as shown by the waveforms in FIGURES 2 and 3, during the Start transition mode, when the oscillator clock OSCIN has stabilized to the point where it transitions through the high and low amplitude thresholds in each clock cycle, the input sampler module generates both CLOCK A and CLOCK B pulses for that cycle. As OSCIN transitions on a falling edge through the high (near VDD) and low (near VSS) amplitude thresholds, the edge-triggered triggered pulse logic receives first the rising edge of CLOCK A and then the rising edge of CLOCK B. Receipt of both the CLOCK A and CLOCK B rising edges (corresponding to OSCIN cycling on a falling edge through both the high and low threshold levels near VDD and VSS), triggers the flip-flop operation of the triggered pulse logic, which generates the inverted leading edge of the transition /PULSE (see FIG. 3). This PULSE is fed back through the series-inverter delay line to provide the /CLEAR input to the triggered pulse logic, which is cleared to produce the trailing edge of the transition /PULSE. The triggered pulse logic is reset on the succeeding rising edge of OSCIN, preparing it to generate the next /PULSE on the succeeding falling edge of OSCIN. Pulse generator module 20 continues to generate transition /PULSEs for each OSCIN cycle that satisfies the selected high/low amplitude threshold criteria.

4. Pulse Counter Module. The high/low transition /PULSE output from pulse generator module 20 is applied to pulse counter module 30.

As shown in FIG. 1, Pulse counter module 30 includes a pulse counter capacitor Cl that is coupled to receive a charging current from VDD through P-channel charging transistors 31 and 32. Transition pulse detection charging transistor 31 receives the transition PULSE output from pulse generator module 20, while charging transistor 32 receives an analog SET signal. The SET signal biases charging transistor 32 in its linear region, creating a resistance in the VDD/31/32 charging path that limits charging current, and thereby controls the rate at which pulse counter capacitor Cl is charged.

Charging transistor 31 detects transition/PULSEs, turning on each time a negative-going transition /PULSE is received from pulse generator 20, and providing charging current from VDD to pulse counter capacitor Cl. Each time a transition /PULSE is detected by charging transistor 31 (indicating an acceptable high/low transition of the oscillator clock), the pulse counter capacitor voltage increases incrementally. Thus, the voltage on pulse counter capacitor Cl is proportional to the number of transition /PULSEs, effecting the pulse counting function.

When the voltage on pulse counter capacitor Cl reaches the Vih threshold of Schmitt trigger circuit 34, the trigger circuit is activated and provides an active CLOCK STABLE signal through an inverter 35. That is, the Schmitt trigger 34 detects when pulse counter capacitor Cl has counted the selected number of transition /PULSEs (approximately 30), and then switches CLOCK STABLE from inactive to active, notifying the microcomputer that the oscillator has stabilized, and therefore, the system clock SYSCLOCK from input sampler module 10 is stable.

In summary, as shown by the /PULSE and CLOCK STABLE waveforms in FIG. 2, the CLOCK STABLE output from the Schmitt trigger (through the following inverter) is driven inactive (low) at the beginning of a Halt mode, and remains inactive through the Start mode. During the Start mode, the pulse counter capacitor Cl is incrementally charged by current pulses resulting from the receipt of transition /PULSEs generated by the pulse generator module when the oscillator clock is producing clock cycles OSCIN meeting the selected high/low-threshold amplitude criteria. After the selected number of transition /PULSEs (approximately 30), indicating a corresponding number of stable oscillator cycles, the pulse counter capacitor is charged to the Vih trigger threshold of the Schmitt trigger. The Schmitt trigger switches CLOCK STABLE from inactive (low) to active (high), terminating the Start mode and initiating the Run mode with an active CLOCK STABLE notice to the microcomputer.

The duration of the Start mode is determined by four circuit parameters that may be independently selected: (a) the width of the transition /PULSEs as determined by the delay line; (b) the resistance of the capacitor charging path through the charging transistors 31 and 32, as determined by the bias level of transistor 32 established by the SET signal and the sizes of the charging transistors; (c) the capacitance of pulse counter capacitor Cl; and (d) the Vih voltage threshold of the Schmitt trigger circuit. Setting these parameters is a matter of routine design choice, subject to assuring that the Start mode lasts long enough for a sufficient number of transition /PULSEs to indicate that the oscillator clock is stable, and therefore, the system clock generated by the input sampler module is stable. That is, these parameters are selected so that the CLOCK STABLE signal is switched active, initiating the Run mode, only after the number of oscillator cycles that cycle through the selected high and low amplitude thresholds (yielding a given noise margin at both ends), indicates that the oscillator clock is stable. The recommended approach is to set these parameters so that the Start mode terminates, and the Run mode initiates, after approximately 30 stable oscillator clock cycles, thereby in effect filtering extraneous large amplitude pulses that typically occur immediately after oscillator start-up.

As shown in FIG. 1, pulse counter module 30 also includes a charging P-channel transistor 36 and a discharging N-channel transistor 37 that control the voltage on pulse counter capacitor Cl, and therefore the CLOCK STABLE output from Scmitt trigger 34, during the Run and Halt modes (i.e., outside the Start mode). Run-mode charging transistor 36 and discharging transistor 37 are controlled by, respectively, the /CHARGE and DISCHARGE signals from control logic module 40.

During a Halt mode, charging transistor 36 is turned off, while discharging transistor 37 is turned on, discharging pulse counter capacitor Cl, and thereby insuring that the CLOCK STABLE output from Schmitt trigger 34 remains inactive. At the beginning of a Start mode, the DISCHARGE signal is switched inactive (high) to turn off N-channel discharging transistor 37 and allow pulse counter capacitor Cl to be charged through charging transistors 31 and 32 (charging transistor 36 remains off). After the Start mode is terminated, and the Run mode is initiated, the /CHARGE signal is switched active (low) to turn on P-channel charging transistor 36 and charge pulse counter capacitor Cl to the level of VDD (discharging transistor 37 remains off).

Maintaining pulse counter capacitor Cl charged to the VDD level during the Run mode, which is significantly above the Vih trigger level, takes Schmitt trigger 34 out of its high current active region, saving power. In addition, some noise immunity is gained by taking the trigger circuit's input far above its switching point, thereby insuring that the CLOCK STABLE output remains active during the transition from Start to Run modes, i.e., when the microcomputer moves from a low-power mode to a high-power mode causing significant amounts of power supply noise.

In summary, as shown by the /CHARGE and DISCHARGE waveforms in FIG. 2, during Run mode operation, /CHARGE is low, maintaining P-channel charging transistor 36 on, and DISCHARGE is low, maintaining N-channel discharging transistor off, so that pulse counter capacitor Cl remains charged to VDD through charging transistor 36, thereby maintaining the CLOCK STABLE output from the Schmitt trigger active while minimizing the current drain through the Schmitt trigger At the beginning of a Halt mode, the HALT/RUN command is low (HALT), causing the control logic module to switch both /CHARGE and DISCHARGE high, turning off the charging path through charging transistor 36 and turning on the discharging path through discharging transistor 37, thereby maintaining pulse counter capacitor Cl at a discharged (0 volt) level. When HALT/RUN is switched to RUN to initiate a Start mode, DISCHARGE is driven low to turn off the discharge path through discharging transistor 37 (the /CHARGE signal remains high to maintain charging transistor 36 off). During Start mode operation, pulse counter capacitor Cl is charged by the receipt of transition /PULSEs from the pulse generator module. At the end of the Start transition, the CLOCK STABLE output from the pulse counter module switches active, causing the control logic module to drive the /CHARGE signal low, turning on charging transistor 36 and charging pulse counting capacitor Cl to VDD.

5. Control Logic Module. As shown in FIGURE 1, control logic module 40 receives the HALT/RUN command from the microcomputer and the CLOCK STABLE signal from pulse counter module 30, and in response provides an ENABLE control signal to input sampler module 10 and the /CHARGE and DISCHARGE control signals to pulse counter module 30.

The HALT/RUN command from the microcomputer is input through an inverter 42 to a NOR gate 44, the other input of which is provided by the CLOCK STABLE signal from the pulse counter module. NOR gate 44 outputs the ENABLE control signal to Clock A NAND 11 and Clock B NAND gate 14 in the input sampler module.

The inverted HALT/RUN command provides the DISCHARGE signal output from control logic module 40. The un-inverted HALT/RUN command is applied directly to a NAND gate 46 which also receives the CLOCK STABLE signal, and provides the /CHARGE output of the control logic module. DISCHARGE is active (high) only during a Halt mode (i.e., when HALT/RUN is HALT). /CHARGE is active (high) during the Halt and Start modes, i.e., when either HALT/RUN or CLOCK STABLE is low.

NOR gate 44 provides an active (high) ENABLE control signal to the Clock A/Clock B NAND gates 11/14 during the Start mode transition from Halt to Run, i.e., when both the inverted RUN command from the microcomputer and the CLOCK STABLE signal from pulse counter module 30 are low. While ENABLE is active, the Clock A/Clock B NAND gates are enabled to output the respective CLOCK A and CLOCK B signals in response to the input oscillator clock OSCIN. When the Start transition mode is completed, and the CLOCK STABLE signal from pulse counter module switches high, the ENABLE output from NOR gate 44 is driven inactive, disabling Clock A/Clock B NAND gates 11/14, and effectively disconnecting the oscillator clock OSCIN from the following pulse generator and pulse counter modules. That is, during the Run mode, the oscillator clock OSCIN is applied to Sysclock NAND gate 17 to provide the system clock output without the remainder of the clock stability circuit consuming any switching current.

As shown by the waveforms in FIG. 2, during Run mode operation, the RUN/HALT command is maintained high (RUN) by the microcomputer so that the inverted RUN/HALT command is low. As a result, ENABLE is inactive (low) disabling Clock A/Clock B NAND gates 11/14 (to provide DC isolation), while /CHARGE is active (low) and DISCHARGE (the inverted RUN) is inactive (low) to hold the CLOCK STABLE output from the pulse counter module active.

When the microcomputer switches the RUN/HALT command inactive (HALT) to initiate a low-power Halt mode, /CHARGE and DISCHARGE are driven high (inactive/active), turning off the charging path through charging transistor 36 and discharging the pulse counter capacitor Cl through discharging transistor 37. Discharging the pulse counter capacitor drives the CLOCK STABLE output from the pulse counter module inactive (ENABLE is maintained inactive by the inverted HALT).

When the microcomputer terminates the Halt mode by making RUN/HALT active (RUN), a Start transition mode is initiated. ENABLE is switched active, enabling Clock A/Clock B NAND gates 11/14 and connecting the oscillator clock input OSCIN through those gates to the pulse generator module. At the same time, DISCHARGE (i.e., the inverted RUN/HALT) switches inactive (low) to turn off the discharge path for the pulse counter capacitor, allowing it to be charged by the transition /PULSEs from the pulse generator module.

During the Start mode, ENABLE is maintained active by the inactive CLOCK STABLE signal from the pulse counter module and the inverted RUN/HALT signal from the microcomputer, thereby allowing the input sampler module to generate the CLOCK A and CLOCK B signals that designate oscillator clock OSCIN transitions between the selected high and low amplitude thresholds, and cause the pulse generator module to output transition /PULSEs. The control logic module maintains /CHARGE inactive (high) and DISCHARGE inactive (low), allowing the pulse counter capacitor to charge in response to the transition /PULSEs from the pulse generator module.

At the completion of the Start transition mode, when the selected number of transition /PULSEs have been received by the pulse counter module, the CLOCK STABLE output from the pulse counter module switches active, causing the control logic module to switch the ENABLE control signal inactive (disenabling Clock A/Clock B NAND gates 11/14), and to disconnect the pulse generator and pulse counter modules from the oscillator (only the system clock SYSCLOCK continues to be generated by the input sampler module). At the same time, /CHARGE is switched active (low), charging the pulse counter capacitor to the VDD level to maintain CLOCK STABLE active.

6. Conclusion. The clock stability circuit of this invention allows a rapid and reliable Start mode transition between a low-power Halt mode and the normal Run mode of operation of a microcomputer or other similar device.

Because the clock stability circuit detects oscillator clock cycles that are stable in terms of clean transitions between selected high and low-threshold amplitude levels, the clock stability circuit is able to assure stable clock generator operation after oscillator start-up more rapidly and more reliably than current digital counter techniques.

During the Start transition mode, an input sampler module filters the input oscillator clock OSCIN, rejecting clock cycles that do not complete a clean transition between selected high and low amplitude thresholds (characteristic of stable oscillator clock operation). A pulse generator module provides transition /PULSEs for each oscillator clock cycle in which the oscillator amplitude achieves the selected high and low thresholds, indicating a clock transition with a selected amount of noise margin on both the high and low ends. A pulse counter module detects when a selected number of transition /PULSEs have been generated by the pulse generator module (i.e, when the oscillator has output a selected number of stable clock cycles) and then provides a CLOCK STABLE signal to the microcomputer, indicating that the system clock is stable and that the Run operational mode may be re-entered.

The clock stability circuit has been described in connection with a preferred logic implementation. The implementation of the various functions performed by the clock stability circuit is a matter of routine design choice, and may be implemented using any number of equivalent circuits. The use of 1 and 0 to designate specific logic states is exemplary.

Although the present invention has been described with respect to a specific, preferred embodiment, various changes and modifications may be suggested to one skilled in the art, and it is intended that the present invention encompass such changes and modifications as fall within the scope of the appended claims.

What is claimed is:

1. A counting circuit comprising:
   a pulse generator operative to generate a pulse signal, said pulse generator being responsive to clock cycles applied to an input of said pulse generator which cycle through selected high and low thresholds; and
   a pulse counter connected to said pulse generator having a pulse storage element operative to store charges and a charge control circuit operative to dispense charges to said storage element, said charge control circuit being controlled by the pulse signal from said pulse generator.

* * * * *